United States Patent [19]
Krejchi et al.

[11] Patent Number: 6,139,945
[45] Date of Patent: Oct. 31, 2000

[54] POLYMERIC FOAM SUBSTRATE AND ITS USE AS IN COMBINATION WITH DECORATIVE SURFACES

[75] Inventors: Mark Krejchi; Robson Mafoti; Tony Oriseh; Jim Gonzales, all of Temple; Mike Ingrim, Belton, all of Tex.

[73] Assignee: Premark RWP Holdings, Inc., Wilmington, Del.

[21] Appl. No.: 08/978,026

[22] Filed: Nov. 25, 1997

[51] Int. Cl.[7] ................................................ B32B 5/18
[52] U.S. Cl. ................................ 428/317.9; 428/318.4; 428/542.2; 428/542.6
[58] Field of Search .................... 428/317.9, 318.4, 428/542.2, 542.6

[56] References Cited

U.S. PATENT DOCUMENTS

| | | | |
|---|---|---|---|
| 3,010,861 | 11/1961 | Reese | 156/199 |
| 3,159,698 | 12/1964 | Suh et al. | 264/210 |
| 3,220,902 | 11/1965 | Edwards | 156/79 |
| 3,331,900 | 7/1967 | Thomas | 264/47 |
| 3,398,035 | 8/1968 | Cleereman et al. | 156/244 |
| 3,458,386 | 7/1969 | Shanok et al. | 161/121 |
| 3,647,588 | 3/1972 | Greig | 156/79 |
| 3,669,794 | 6/1972 | Mazur | 156/244 |
| 3,733,381 | 5/1973 | Willette et al. | 264/47 |
| 3,741,844 | 6/1973 | Schwartz | 156/244 |
| 3,769,380 | 10/1973 | Wiley . | |
| 3,824,139 | 7/1974 | Ware et al. | 156/79 |
| 3,855,376 | 12/1974 | Ono et al. | 264/46.1 |
| 3,857,914 | 12/1974 | Aishima et al. | 264/45.5 |
| 3,879,505 | 4/1975 | Boutillier et al. | 264/48 |
| 3,927,160 | 12/1975 | Medley | 264/45.5 |
| 3,956,438 | 5/1976 | Schippers | 264/46.1 |
| 3,957,940 | 5/1976 | Schubert et al. | 264/171 |
| 3,959,432 | 5/1976 | Wiley | 264/171 |
| 3,968,196 | 7/1976 | Wiley . | |
| 4,017,245 | 4/1977 | Lang | 425/327 |
| 4,107,247 | 8/1978 | Dukess . | |
| 4,128,369 | 12/1978 | Kemerer et al. | 425/113 |
| 4,128,689 | 12/1978 | Heaps et al. . | |
| 4,173,505 | 11/1979 | Jacobs | 156/258 |
| 4,206,165 | 6/1980 | Dukess | 264/45.9 |
| 4,221,624 | 9/1980 | Eslinger et al. | 156/243 |
| 4,339,507 | 7/1982 | Kurtz et al. . | |
| 4,399,086 | 8/1983 | Walter | 264/45.5 |

(List continued on next page.)

FOREIGN PATENT DOCUMENTS 0802327  2/1981  Russian Federation ........ C08L 27/06

OTHER PUBLICATIONS

Daniel Klempner, et al., Kirk Othmer Encyclopedia of Chemical Technology, 4th Edition, vol. 11, 3 pages, "Handbook of Polymeric Foams and Foam Technology", 1997.

*Primary Examiner*—Daniel Zirker
*Attorney, Agent, or Firm*—Fulbright & Jaworski L.L.P.

[57] ABSTRACT

A polymeric foam composition is provided for use as a substrate in decorative compositions having at least one decorative layer on the substrate, wherein the substrate is prepared by foaming a composition made of (i) a resin matrix of one or more polymers selected from acrylonitrile-butadiene-styrene (ABS) polymers, polycarbonates, polystyrenes, polyphenylene oxide and polyvinyl chloride polymers, preferably obtained from recycled plastics, and (ii) a filler, using one or more blowing agents. The resulting foam composition has physical and mechanical properties sufficient for its use in place of fiberboard or particle board in the preparation of various laminate based decorative products, such as laminate flooring, solid surface laminates, countertops, etc.

28 Claims, 1 Drawing Sheet

U.S. PATENT DOCUMENTS

| | | | |
|---|---|---|---|
| 4,430,288 | 2/1984 | Bonis | 264/510 |
| 4,440,824 | 4/1984 | Bonis . | |
| 4,478,660 | 10/1984 | Landler et al. | 156/78 |
| 4,518,557 | 5/1985 | Wecker . | |
| 4,600,461 | 7/1986 | Guy | 156/244.12 |
| 4,784,904 | 11/1988 | Wood et al. | 428/317.9 |
| 4,812,186 | 3/1989 | McConnell et al. | 156/90 |
| 4,844,944 | 7/1989 | Graefe et al. | 428/357 |
| 4,889,669 | 12/1989 | Suzuki | 264/45.9 |
| 4,911,978 | 3/1990 | Tsubone et al. | 428/317.9 |
| 5,215,691 | 6/1993 | Bland et al. . | |
| 5,221,395 | 6/1993 | Luetkens, Jr. et al. | 156/244.11 |
| 5,226,998 | 7/1993 | Few | 156/244.11 |
| 5,245,812 | 9/1993 | Landers | 428/317.9 X |
| 5,354,402 | 10/1994 | Luetkens et al. | 428/317.9 X |
| 5,374,383 | 12/1994 | Brambach | 264/46.5 |
| 5,508,103 | 4/1996 | Cope | 428/318.8 |
| 5,510,398 | 4/1996 | Clark et al. . | |
| 5,591,496 | 1/1997 | Anderson et al. | 428/36.5 |
| 5,601,679 | 2/1997 | Mulcahy et al. | 156/242 |
| 5,622,582 | 4/1997 | Foxcroft | 156/199 |
| 5,633,063 | 5/1997 | Lause et al. | 428/317.9 X |
| 5,665,284 | 9/1997 | Erwin et al. . | |

POLYMERIC FOAM SUBSTRATE AND ITS USE AS IN COMBINATION WITH DECORATIVE SURFACES

BACKGROUND OF THE INVENTION

1. Field of the Invention

The present invention relates to a foamed polymer composition having suitable mechanical properties for use as a substrate for decorative surfaces in applications such as laminate flooring, tabletops or countertops, and wall panels.

2. Description of the Related Art

Conventional laminate products are well known in the art. They generally are prepared by laminating a decorative layer and one or more kraft paper layers together using various types of resins, such as melamine formaldehyde and phenolic resins. The resulting decorative laminate is then adhered to a substrate, usually of fiberboard or particle board. The thus prepared product is known as high pressure decorative laminate. Alternatively, low pressure decorative laminate is prepared by laminating a decorative layer, with or without an overlay layer, directly onto a fiberboard or particle board substrate, using the same type of resins used in high pressure decorative laminate. However, while the use of such wood based substrates provides the necessary rigidity for structural uses such as flooring and countertops, these wood based substrates are heavy and can warp in the presence of moisture.

One possible solution to these problems would be to use polymeric substrates for preparing laminates. However, polymeric materials tend to be considerably more expensive, especially those having the desired rigidity and performance characteristics for use in laminate applications.

Foamed polymers are known and are used in various structural end uses. The preparation of polymer foams and their conventional uses are described in Kirk Othmer Encyclopedia of Chemical Techonology, 4th Ed., Vol. 11, John Wiley and Sons, N.Y., pp. 730–783 (1997), as well as the "Handbook of Polymeric Foams and Foam Technology", ed. by D. Klempner and K. C. Frisch, Hanser Publishers, N.Y. (1991), the contents of both of which are hereby incorporated by reference.

Another problem that exists is the generation of polymeric wastes, either as manufacturing tailings or through the obsolescence of various commercial products using polymeric materials as the housings, supports and various internal parts of the product. Such products include things such as televisions, stereos, computers, printers, typewriters, etc. Due to the nature of these products and the rapid advancement of technology surrounding them, these types of products are being replaced with increasing frequency. A problem that then arises is how to dispose of the polymer based parts of these devices in an environmentally sound manner, as well as in an economically sound manner.

Accordingly, it would be useful to have a substrate material that overcomes the above disadvantages of wood based substrates, while having minimal costs. Further, if such a substrate is made of polymeric material, it would be advantageous to have a product that can be made from recycled polymers.

SUMMARY OF THE INVENTION

Accordingly, one object of the present invention is to provide a polymeric foam composition having sufficient rigidity and mechanical properties for use as a substrate in structural and decorative uses such as laminate flooring or decorative laminate.

A further object of the present invention is to provide a polymeric foam composition having the above properties which is prepared from recycled plastics.

These and other objects of the present invention have been satisfied by the discovery of a multilayer decorative composition, comprising:

a substrate comprising a polymer foam, wherein the polymer foam is prepared by foaming a composition comprising (i) a resin matrix of one or more polymers selected from the group consisting of acrylonitrile-butadiene-styrene (ABS) polymers, polycarbonates, polystyrenes, polyphenylene oxide and polyvinyl chloride polymers and (ii) a filler, using a blowing agent selected from the group consisting of exothermic blowing agents, endothermic blowing agents and mixtures thereof; and one or more decorative layers bonded to at least one surface of said substrate; and the use of this multilayer decorative composition in various applications traditionally restricted to particle board or fiberboard substrate based decorative laminates, such as laminate flooring and high pressure decorative laminate countertops, tabletops, etc..

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
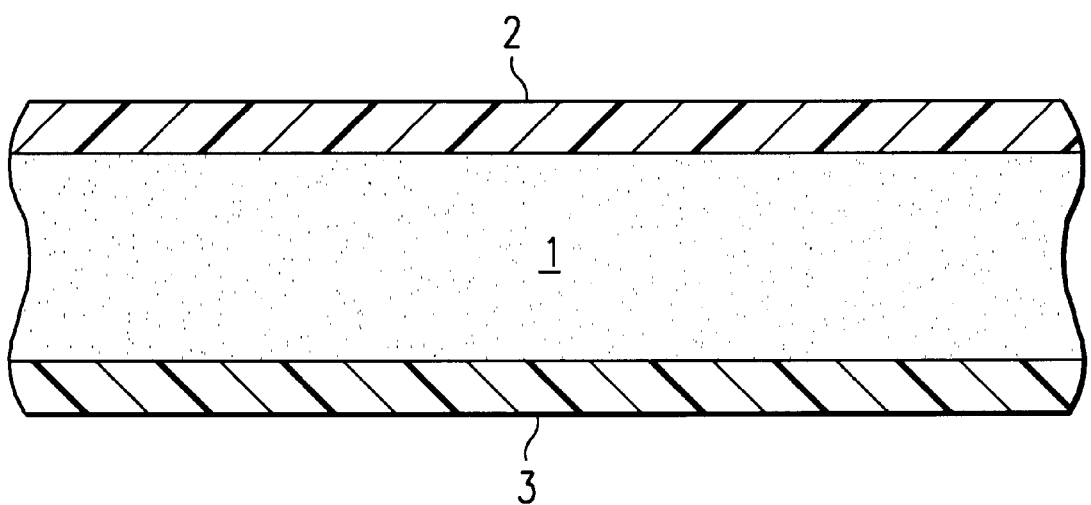
FIG. 1 shows a typical laminate construction showing the substrate (1), decorative laminate layer (2) and the backing layer (3).

The present invention relates to a polymeric foam substrate having the structural properties sufficient to permit its use as the core in laminate type products such as laminate flooring, high pressure decorative laminate countertops, etc., and laminate type products having the polymer foam composition as the core thereof.

The polymeric foam substrate of the present invention can be prepared from any polymer that can be foamed, so long as the prepared foam has the structural and mechanical properties necessary for the end use desired. In particular, it is preferred that the substrate have a compression set that is approximately the same or better than conventional medium or high density fiberboard or particle board (wherein compression set is measured in accordance with ASTM F970, as thickness decrease as a function of compressive stress). Preferably this thickness decrease at 2000 psi is at most 0.01 in., more preferably at most 0.005 in., and most preferably at most 0.001 in. In addition, the polymeric foam substrate of the present invention preferably has a coefficient of linear thermal expansion (in accordance with ASTM D-696) of from $7 \times 10^{-5}$ to $0.1 \times 10^{-5}$ in/in/°F., more preferably from $2 \times 10^{-5}$ to $0.5 \times 10^{-5}$ in/in/°F., most preferably from $1 \times 10^{-5}$ to $0.6 \times 10^{-5}$ in/in/°F.

Preferably, the polymeric foam comprises one or more members selected from the group consisting of poly (acrylonitrile/butadiene/styrene) (hereafter referred to as ABS) resins such as flame retardent ABS resins and glass filled ABS resins; polycarbonate; high impact polystyrene (HIPS), polystyrene, polyphenylene oxide (PPO), and polyvinyl chloride (PVC). The polymer can be virgin polymer or recycled polymer. Preferably, the substrate foam is prepared from a comingled resin system containing, but not limited to, one or more of the above listed polymers. Further, these polymers can be filled or unfilled, although from an impact resistance and physical property standpoint, the filled polymers are best. In a most preferred embodiment, the polymer is obtained from reclaimed plastic casings and parts from electronics equipment, such as computers, printers, televisions, stereos, etc. This reclaimed plastic is obtained by removal of substantially all ferrous-based metals and other non-plastic parts from the electronics equipment, followed by granulation of the plastic. Within the context of the present invention, the term "substantially" means >95% of the original amount of ferrous based metals and other non-plastic parts in the electronics equipment, preferably >99% of the original amount. The reclaimed plastic is normally a mixture of two or more of the above noted preferred polymers, with 50% or more, preferably 75% or more, being ABS, with or without flame retardent or glass fillers.

The polymer used in preparing the polymeric foam of the present invention can be foamed using any conventional blowing agent, such as exothermic blowing agents, endothermic blowing agents or combinations thereof, so long as the cell size of the foam can be adjusted to provide the structural and mechanical properties required in the desired end use. The preparation of foamed polymers is known in the art and is described, for example, in the above-noted Kirk Othmer Encyclopedia of Chemical Technology and "Handbook of Polymeric Foams and Foam Technology."

Preferred exothermic blowing agents include azodicarbonamide blowing agents. The exothermic blowing agents tend to provide a larger cell size in the foam produced than the endothermic blowing agents. A preferred endothermic blowing agent is a combination of calcium carbonate (or bicarbonate) and a carboxylic acid. Suitable carboxylic acids are known in the art of foam making and must be capable of helping initiate formation of $CO_2$ from the calcium carbonate or bicarbonate. Such carboxylic acids include, but are not limited to, acids such as citric acid. In high load end uses, such as laminate flooring, the use of only an exothermic blowing agent tends to provide a foam with insufficient resistance to compression due to the oversized cells, while the use of an endothermic blowing agent alone requires larger amounts of the blowing agent (thus increasing materials and processing costs), without the ability to generate the density reduction sufficient to reduce the overall weight of the foam to a desired level for handleability. Thus, in a preferred embodiment of the present invention, the blowing agent is a combination of an exothermic blowing agent and an endothermic blowing agent. In particular, the most preferred blowing agent is a combination of an azodicarbonamide blowing agent and $CaCO_3$ (or bicarbonate)/carboxylic acid. The determination of the amount of blowing agent needed and ratio of endothermic/exothermic blowing agents is within the skill of one of ordinary skill in the art of polymer foam preparation and depends on the final foam properties desired. Preferably, the blowing agent is used in an amount of up to 3% of the polymer, more preferably from 1 to 2% by weight of the polymer.

The polymer of the present invention can be used alone or with one or more fillers, in order to obtain the desired physical properties of the resulting foam. Preferably, the filler can be one or more conventional fillers, more preferably one or more fillers selected from the group consisting of calcium carbonate, talc, silica, glass fibers, alumina and wollastonite. These fillers also include surface treated fillers. Most preferably, the filler is surface treated calcium carbonate, commercially available as DF30T from Franklin Industrial Minerals, of Dalton, Ga. The resin:filler ratio ranges from 100:0 to 30:70, preferably from 90:10 to 50:50, more preferably from 75:25 to 65:35.

In an illustrative embodiment, the reclaimed polymer is compounded with the filler surface treated calcium carbonate (DF30T) in a ratio of resin:$CaCO_3$ of 70:30. Compounded into a separate type of pellet is the blowing agent. This separate pellet can be prepared from the same resin that makes up the majority of the reclaimed polymer or from a different resin that is present in the reclaimed polymer mixture. The blowing agent containing pellet is then added to the reclaim polymer/filler mixture in an amount sufficient to bring the blowing agent to a level of approximately 1.5%, based on the overall mixture. The resulting mixture can be directly extruded and blown. Alternatively, the blowing agent itself (in unpelletized form) can be added directly to the reclaim polymer/filler mixture in the extuder. The polymer is foamed to a density reduction level sufficient to meet the requirements of the desired end use. For non-load bearing uses, the polymer can be foamed to a density reduction of up to 75–80%. For load-bearing end uses, such as countertops and flooring applications, the polymer is preferably foamed to a density reduction of up to about 50%, more preferably from 25–35% density reduction and most preferably about 30% density reduction. Density reduction, as used in the present invention, is the percentage by which the density of the foamed product is lower than the density of the non-foamed polymer.

The foamed polymer product of the present invention can be used as a substrate for a wide variety of end uses. In particular, the foam product of the present invention can be used as a replacement for fiberboard or particle board substrates in laminate products, such as high-wear laminate flooring and high pressure decorative laminate, such as used in kitchen countertops or tabletops. Other uses include as a substrate for solid surface veneer (conventionally known as ⅛" solid surfacing materials, typically polyacrylics containing various fillers, such as the SSV products sold by Wilsonart International, Inc.) and solid surface laminate products (<100 mil thick solid surfacing products), also in the place of fiberboard. In this application, the foamed polymer composition can be separately extruded then bonded to the solid surface veneer or laminate, or, in the case of solid surface laminates (as disclosed in U.S. application Ser. No. 08/899,118, hereby incorporated by reference) the polymer foam composition of the present invention can be co-extruded with the solid surface laminate to form a multilayer coextruded product. Other uses include as a substrate for various decorative layers, either high pressure or low pressure laminates, as well as non-laminate decorative coatings. The preparation of the laminate layers used in these various products is known in the art.

By way of example, the use of the present invention foamed composition as a substrate for laminate flooring will be described. However, this should not be seen as limiting the present invention to laminate flooring applications, since those of skill in the art will readily recognize the wide ranging applicability of the foam composition of the present invention in many different end uses.

FIG. 1 shows a typical laminate product structure, showing the substrate (1), the decorative laminate layer (2) and the backing layer (3).

In preparing a laminate product, the decorative surface is conventionally prepared using a decorative paper layer having the desired pattern printed thereon. In the case of flooring, the pattern is often a woodgrain finish, although any pattern is possible. This decorative layer is impregnated with melamine-formaldehyde resin and laminated to one or more sheets of kraft paper, which have been impregnated with phenol formaldehyde resin. The surface of the decorative layer that will be exposed in the final product is usually prepared by bonding an overlay layer, typically a thin paper sheet impregnated with the same type of melamine formaldehyde resin. Preferably, for flooring applications, a filler is also included in the overlay in order to provide abrasion resistance and a non-slip surface on the final product. Suitable fillers include alumina, calcium carbonate, milled glass fibers, ground glass fibers, etc.

Once the decorative layer is prepared, it can be adhered to the polymer foam core composition of the present invention using conventional adhesives, such as polyvinyl acetate/urethane adhesives, polychloroprene contact adhesives, 1 component urethane adhesives, 2 component urethane adhesives, and other solvent based adhesive systems. Most preferred, both from an adhesion standpoint and cost standpoint, are the polyvinyl acetate/urethane adhesives.

The bottom of the flooring section containing the polymer foam composition of the present invention is a conventional backer sheet used in high pressure decorative laminate and conventional laminate flooring. The backer sheet is prepared by laminating one or more sheets of kraft paper impregnated with melamine formaldehyde resin. The resulting laminate is also adhered to the underside of the polymer foam composition using a conventional adhesive as discussed above.

Obviously, additional modifications and variations of the present invention are possible in light of the above teachings. It is therefore to be understood that within the scope of the appended claims, the invention may be practiced otherwise than as specifically described herein.

We claim:

1. A multilayer decorative composition comprising:
   a substrate comprising a polymer foam, wherein the polymer foam is prepared by foaming a composition comprising (i) a resin matrix of at least two polymers selected from the group consisting of acrylonitrile-butadiene-styrene (ABS) polymers, polycarbonates, polystyrenes, polyphenylene oxide and polyvinyl chloride polymers and (ii) a filler, wherein said polymer foam is prepared using a blowing agent selected from the group consisting of exothermic blowing agents, endothermic blowing agents and mixtures thereof, and wherein said resin matrix is obtained by reclamation of recycled polymeric waste by a process comprising: removing substantially all non-plastic parts from the recycled polymeric waste and granulating the remaining plastic; and
   one or more decorative layers bonded to at least one surface of said substrate, wherein said decorative layers comprise a decorative paper impregnated with a melamine formaldehyde resin.

2. The multilayer decorative composition of claim 1, wherein said resin matrix comprises at least one member selected from the group consisting of fire retardant ABS polymers and glass filled ABS polymers.

3. The multilayer decorative composition of claim 1, wherein said resin matrix comprises at least one member selected from the group consisting of high impact polystyrenes (HIPS).

4. The multilayer decorative composition of claim 1, further comprising an overlay impregnated with said resin on said decorative paper.

5. The multilayer decorative composition of claim 1, further comprising one or more layers of kraft paper impregnated with phenol-formaldehyde resin located between said decorative paper and said substrate.

6. The multilayer decorative composition of claim 1, wherein said substrate has a decorative layer on each of two opposing sides of said substrate.

7. The multilayer decorative composition of claim 1, wherein said decorative layer is prepared by continuous lamination of said decorative layer with said substrate, as said substrate is extruded through an extrusion die.

8. A multilayer decorative composition, comprising:
   a substrate comprising a polymer foam, wherein the polymer foam is prepared by foaming a composition comprising (i) a resin matrix of at least two polymers selected from the group consisting of acrylonitrile-butadiene-styrene (ABS) polymers, polycarbonates, polystyrenes, polyphenylene oxide and polyvinyl chloride polymers and (ii) a filler, wherein said polymer foam is prepared using a blowing agent selected from the group consisting of exothermic blowing agents, endothermic blowing agents and mixtures thereof, wherein said resin matrix comprises at least one member selected from the group consisting of fire retardant ABS polymers, glass filled ABS polymers, and high impact polystyrenes HIPS); and
   one or more decorative layers bonded to at least one surface of said substrate, wherein said decorative layers comprise a solid surfacing veneer or a solid surfacing laminate.

9. The multilayer decorative composition of claim 8, wherein said resin matrix is obtained by reclamation of recycled polymeric waste by a process comprising: removing substantially all non-plastic parts from the recycled polymeric waste and granulating the remaining plastic.

10. The multilayer decorative composition of claim 8, wherein said substrate has a decorative layer on each of two opposing sides of said substrate.

11. The multilayer decorative composition of claim 8, wherein said decorative layer is prepared by coextrusion of said decorative layer with said substrate.

12. A multilayer decorative composition, comprising:
    a substrate comprising a polymer foam, wherein the polymer foam is prepared by foaming a composition comprising (i) a resin matrix of at least two polymers selected from the group consisting of acrylonitrile-butadiene-styrene (ABS) polymers, polycarbonates, polystyrenes, polyphenylene oxide and polyvinyl chloride polymers and (ii) a filler, wherein said polymer foam is prepared using a blowing agent selected from the group consisting of exothermic blowing agents, endothermic blowing agents and mixtures thereof, and wherein said resin matrix is obtained by reclamation of recycled polymeric waste by a process comprising: removing substantially all non-plastic parts from the recycled polymeric waste and granulating the remaining plastic; and
    one or more decorative layers bonded to at least one surface of said substrate.

13. The multilayer decorative composition of claim 12, wherein said resin matrix comprises at least one member selected from the group consisting of fire retardant ABS polymers and glass filled ABS polymers.

14. The multilayer decorative composition of claim 12, wherein said resin matrix comprises at least one member selected from the group consisting of high impact polystyrenes (HIPS).

15. The multilayer decorative composition of claim 12, wherein said decorative layer comprises a decorative paper impregnated with a melamine formaldehyde resin.

16. The multilayer decorative composition of claim 15, further comprising an overlay impregnated with said resin on said decorative paper.

17. The multilayer decorative composition of claim 15, further comprising one or more layers of kraft paper impregnated with phenol-formaldehyde resin located between said decorative paper and said substrate.

18. The multilayer decorative composition of claim 12, wherein said substrate has a decorative layer on each of two opposing sides of said substrate.

19. The multilayer decorative composition of claim 12, wherein said decorative layer is prepared by coextrusion of said decorative layer with said substrate.

20. The multilayer decorative composition of claim 19, wherein said decorative layer is a solid surfacing veneer or a solid surfacing laminate.

21. A multilayer decorative composition, comprising:
   a substrate comprising a polymer foam, wherein the polymer foam is prepared by foaming a composition comprising (i) a resin matrix of at least two polymers selected from the group consisting of acrylonitrile-butadiene-styrene (ABS) polymers, polycarbonates, polystyrenes, polyphenylene oxide and polyvinyl chloride polymers and (ii) a filler, wherein said polymer foam is prepared using a blowing agent selected from the group consisting of exothermic blowing agents, endothermic blowing agents and mixtures thereof, wherein said resin matrix comprises at least one member selected from the group consisting of fire retardant ABS polymers, glass filled ABS polymers, and high impact polystyrenes (HIPS); and
   one or more decorative layers bonded to at least one surface of said substrate.

22. The multilayer decorative composition of claim 21, wherein said resin matrix is obtained by reclamation of recycled polymeric waste by a process comprising: removing substantially all non-plastic parts from the recycled polymeric waste and granulating the remaining plastic.

23. The multilayer decorative composition of claim 21, wherein said decorative layer comprises a decorative paper impregnated with a melamine formaldehyde resin.

24. The multilayer decorative composition of claim 23, further comprising an overlay impregnated with said resin on said decorative paper.

25. The multilayer decorative composition of claim 23, further comprising one or more layers of kraft paper impregnated with phenol-formaldehyde resin located between said decorative paper and said substrate.

26. The multilayer decorative composition of claim 21, wherein said substrate has a decorative layer on each of two opposing sides of said substrate.

27. The multilayer decorative composition of claim 21, wherein said decorative layer is prepared by continuous lamination of said decorative layer with said substrate, as said substrate is extruded through an extrusion die.

28. The multilayer decorative composition of claim 27, wherein said decorative layer is a solid surfacing veneer or a solid surfacing laminate.

* * * * *